(No Model.)
D. M. LOYD.
HARROW.
No. 416,475. Patented Dec. 3, 1889.
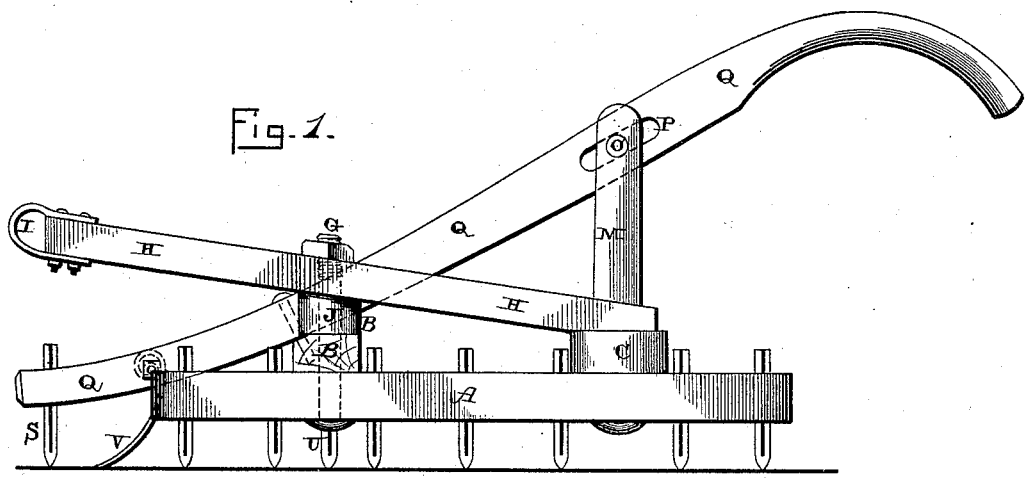
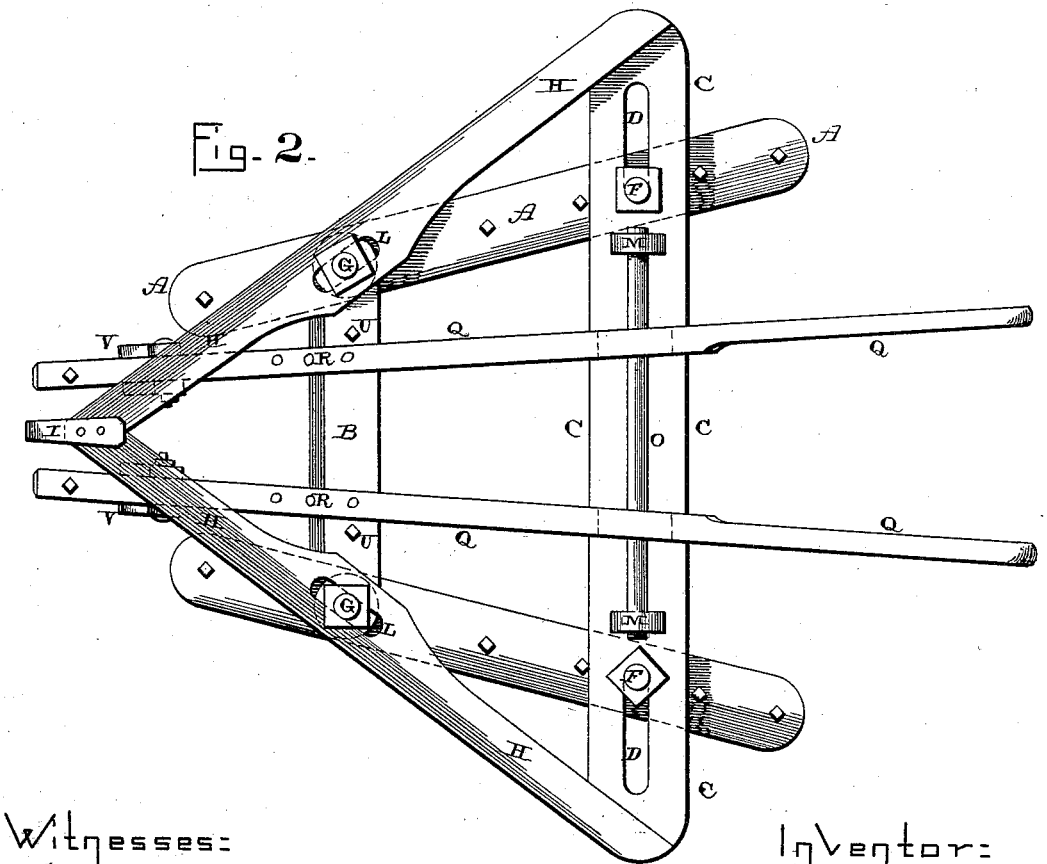
Witnesses:
E. P. Ellis,
J. M. Nesbit.
Inventor:
D. M. Loyd,
per
J. A. Lehmann,
Atty.

UNITED STATES PATENT OFFICE.

DOCTOR MILTON LOYD, OF FAYETTE COUNTY, ASSIGNOR OF TWO-THIRDS TO CHARLES WESTON, OF WASHINGTON COURT-HOUSE, OHIO.

HARROW.

SPECIFICATION forming part of Letters Patent No. 416,475, dated December 3, 1889.

Application filed September 2, 1889. Serial No. 322,780. (No model.)

*To all whom it may concern:*

Be it known that I, DOCTOR MILTON LOYD, of Fayette county, and State of Ohio, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in the combination of the harrow, which is provided with adjustable side bars, the draft-rods, the two handles pivoted upon the front cross-bar of the harrow and having their front ends provided with teeth or cultivators, and which can be laterally adjusted in relation to each other by the driver, as will be more fully described hereinafter.

The objects of my invention are to place the draft-bars at a suitable angle, so as to allow the front ends of the handles carrying teeth or cultivators to be freely adjusted under or through them, and to so pivot the handles and provide their front ends with teeth or cultivators that they can be used both for cultivating upon each side of the growing plants and to guide the harrow at the same time.

Figure 1 is a side elevation of a harrow which embodies my invention. Fig. 2 is a plan view of the same.

A represents the two side beams of the harrow, which are provided with teeth or cultivators of any suitable description, and B C two cross-bars, by which these side bars are connected together. The front cross-bar B is the shortest, while the rear bar C is not only much longer, but is provided with longitudinal slots D through its ends for the clamping-bolts F to pass through. The front ends of the side bars A simply turn upon the pivotal bolts G, which serve to connect the front bar B and the side bars together; but the rear ends of the side bars are laterally adjustable and can be rigidly secured in any position into which they are adjusted by tightening the nuts upon the bolts F. By this lateral adjustment of the side bars their rear ends can be moved outward, so as to widen the harrow and to bring their front ends nearer together, or their rear ends can be moved inwardly at the same time that their front ends are moved apart.

Rigidly secured to the outer ends of the cross-bars C are the draft-rods H, which have their front ends secured together, and to which front ends the clevis I is fastened. These draft-bars do not extend parallel with the side bars A, but are raised at their front ends by means of the washers J, which are placed upon the ends of the cross-bar B, and down through which the clamping-bolts G pass. The front ends of these draft-bars are raised upward, so that there will be less tendency on the part of the draft-animal to lift the harrow from the ground, as is the case where it is fastened directly to the side bars in the usual manner, and so that the front ends of the handles can pass down under and operate freely between or slightly in advance of the side bars A. In order to allow the bolts G a slight movement when the side bars A are adjusted, slots L are made through these draft-rods, as shown, and which slots allow the bolts A slight play in a line with the draft-rods when the rear ends of the side bars are adjusted either in or out.

Rising from the top of the cross-bar C are the two standards M, which are connected together at their tops by the cross-bar O, which passes through the slots P, made in the handles Q. These handles Q are provided with a series of holes near their front ends, and through which the pivotal bolts R are passed, for the purpose of pivoting the handles upon the cross-bar B. These handles extend downwardly from their rear toward their front ends, and passed through these front ends are the teeth or cultivators S, of any suitable description. These two handles are separated far enough from each other to allow the teeth or cultivators S in their front ends to operate upon opposite sides of the row of growing plants. The pivotal bolts R and the slots T allow these two handles Q to be freely adjusted in relation to each other, for the purpose of bringing the teeth or cultivators close together, or moving them far apart, as may be desired. The front ends of these handles may be made to project downward closer to or raised upward above the ground by moving the pivotal bolts R from one perforation to the other.

Owing to the raised ends of the draft-bars H the front ends of the handles can be operated with the greatest freedom in between or in advance of the front ends of the side bars A. The teeth or cultivators which pass through these front ends of the handles and the two teeth or cultivators U, which extend through the cross-bar B, fill the space caused by the separation of the front ends of the bars A, and only leave sufficient room for the growing plants to pass between the teeth or cultivators which extend through the handles Q; also attached to the handles Q are the spring-teeth B, either of the forms shown or any other that may be preferred. These teeth are arranged upon the sides of the front ends of the handles and may be arranged in pairs, as shown; or one may be placed behind the other, as may be desired. I do not limit myself to any particular arrangement of these teeth, for they are intended to operate in connection with the rigid teeth S, which are passed through the front ends of the handles.

Having thus described my invention, I claim—

1. The combination of the side bars A and the cross-bars B C, with draft-rods which are rigidly secured to the outer ends of the cross-bar C and have their front ends secured together, the washers for raising the front ends of the rods, and the clamping-bolts which pass through slots in the rods, substantially as shown.

2. The combination of the side bars A, the cross-bars B C, and the draft-rods H, which are inclined upward at their front ends, with the slotted handles Q, the supporting-rod O, and the bolts R, by means of which the handles are pivoted on the cross-bar of the harrow, substantially as described.

In testimony whereof I affix my signature in presence of two witnesses.

DOCTOR MILTON $\overset{\text{his}}{\times}$ LOYD.
mark

Witnesses:
O. A. SPERRY,
THOS. W. MARCHANT.